United States Patent
Lehavi et al.

(10) Patent No.: US 8,924,316 B2
(45) Date of Patent: Dec. 30, 2014

(54) MULTICLASS CLASSIFICATION OF POINTS

(75) Inventors: David Lehavi, Haifa (IL); Hila Nachlieli, Haifa (IL); Sagi Schein, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 253 days.

(21) Appl. No.: 13/563,690

(22) Filed: Jul. 31, 2012

(65) Prior Publication Data

US 2014/0035954 A1    Feb. 6, 2014

(51) Int. Cl.
G06F 15/18     (2006.01)
G06T 3/40      (2006.01)
G06K 9/62      (2006.01)

(52) U.S. Cl.
CPC .............. *G06T 3/40* (2013.01); *G06K 9/6287* (2013.01)
USPC ......................................................... 706/12

(58) Field of Classification Search
USPC ......................................................... 706/12
See application file for complete search history.

(56) References Cited

U.S. PATENT DOCUMENTS

| | | | |
|---|---|---|---|
| 5,555,317 A | 9/1996 | Anderson | |
| 6,252,960 B1 | 6/2001 | Seroussi | |
| 6,493,380 B1 | 12/2002 | Wu et al. | |
| 6,771,826 B2 | 8/2004 | Boon | |
| 6,828,293 B1 | 12/2004 | Hazenkamp et al. | |
| 6,836,569 B2 | 12/2004 | Le Pennec et al. | |
| 6,901,555 B2 | 5/2005 | Hida et al. | |
| 7,424,172 B2 | 9/2008 | Nose et al. | |
| 7,698,577 B2 | 4/2010 | Jones et al. | |
| 7,958,063 B2 | 6/2011 | Long et al. | |
| 8,005,767 B1 | 8/2011 | Cassella | |
| 8,019,762 B2 * | 9/2011 | Oztop | 707/737 |
| 8,027,544 B2 | 9/2011 | Mitarai et al. | |
| 8,358,806 B2 * | 1/2013 | Dong et al. | 382/103 |
| 8,370,245 B2 * | 2/2013 | Gunther | 705/36 R |
| 8,438,262 B2 * | 5/2013 | Lehavi et al. | 709/223 |
| 8,533,279 B2 * | 9/2013 | Shaqed et al. | 709/206 |
| 8,549,478 B2 * | 10/2013 | Amichai et al. | 717/124 |
| 8,594,448 B2 * | 11/2013 | Nachlieli et al. | 382/260 |
| 8,611,690 B2 * | 12/2013 | Banner et al. | 382/264 |
| 8,756,571 B2 * | 6/2014 | Bergman et al. | 717/124 |
| 8,760,327 B2 * | 6/2014 | Schein et al. | 341/87 |
| 8,761,505 B2 * | 6/2014 | Oicherman et al. | 382/167 |
| 8,762,873 B2 * | 6/2014 | Pnueli et al. | 715/771 |
| 2002/0126803 A1 | 9/2002 | Jones et al. | |
| 2003/0076878 A1 | 4/2003 | Jones et al. | |
| 2008/0063292 A1 | 3/2008 | Nose et al. | |

(Continued)

OTHER PUBLICATIONS

Optimal partitioning for task assignment of spatially distributed vehicles based on quadratic performance criteria, Bakolas, E. American Control Conference (ACC), 2013 DOI: 10.1109/ACC.2013.6580325 Publication Year: 2013, pp. 3206-3211.*

(Continued)

*Primary Examiner* — Michael B Holmes

(57) ABSTRACT

A method includes obtaining, by executing a module stored on a non-transitory computer-readable storage device, approximately-zero polynomials for each of multiple classes. The method further includes evaluating the approximately-zero polynomials for each class on a plurality of points to compute distances from each point to each of the classes. The method also includes scaling the approximately-zero polynomials based on the distances and classifying the points based on the scaled approximately-zero polynomials.

20 Claims, 8 Drawing Sheets

(56) References Cited

U.S. PATENT DOCUMENTS

| | | |
|---|---|---|
| 2008/0313179 A1 | 12/2008 | Trepess et al. |
| 2010/0150577 A1 | 6/2010 | Essiambre et al. |
| 2010/0238305 A1 | 9/2010 | Dent et al. |
| 2010/0256927 A1 | 10/2010 | Hala et al. |
| 2010/0322476 A1 | 12/2010 | Kanhere et al. |
| 2011/0282897 A1 | 11/2011 | Li et al. |

OTHER PUBLICATIONS

Automatic Facial Expression Recognition System, Mliki, H.; Fourati, N.; Smaoui, S.; Hammami, M. Computer Systems and Applications (AICCSA), 2013 ACS International Conference on DOI: 10.1109/AICCSA.2013.6616505 Publication Year: 2013, pp. 1-4.*

Evaluating the Ambiguity of class structures via Instance Neighbor Entropy with weighting, Jing-Doo Wang; Yao-Chug Shi Frontier Computing. Theory, Technologies and Applications, 2010 IET International Conference on DOI: 10.1049/cp.2010.0535 Publication Year: 2010, pp. 43-48.*

On the threshold of Maximum-Distance Separable codes, Kindarji, B.; Cohen, G.; Chabanne, H. Information Theory Proceedings (ISIT), 2010 IEEE International Symposium on DOI: 10.1109/ISIT.2010.5513670 Publication Year: 2010, pp. 1163-1167.*

Saric et al, "Dimensionality Reduction via Euclidean Distance Embeddings," Jul. 2011, 22 p.

Abbott, J., et al, "Stable Border Bases for Ideals of Points", Dec. 2008.

International Search Report and Written Opinion of the International Searching Authority, mailed Mar. 28, 2013, issued in related PCT Application No. PCT/US2012/048879.

Kiraly, F.J. et al, "Regression for Sets of Polynomial Equations", Feb. 20, 2012.

Kravtchenko, V., "Tracking Color Objects in Real Time", Aug 27, 1999, 82 p.

Kreuzer, Martin et al, "Subideal Border Bases", Mathematics of Computation, V. 80(274), pp. 1135-1154, Apr. 2011.

Liu, Cheng-Lin et al, "Class-specific feature polynomial classifer for pattern classification and it's application to . . . ", Pattern Recognition, V.39, pp. 669-681, 2006.

Nourouzian, Ehsan et al, "Online Persian/Arabic Character Recognition by Polynomial Representation . . . ", IEEE Int'l Conf on Pattern Recognition, 2006.

Watson et al., "Wavelet Transforms on Vector Spaces as a Method of Multispectral Image Characterisation," Jul. 4-6, 1995, pp. 222-226.

Heldt et al., "Approximate Computation of Zero-Dimensional Polynomial Ideals," Nov. 2009, 27 p.

* cited by examiner

MULTICLASS CLASSIFICATION OF POINTS

BACKGROUND

In various data classification techniques, a set of tagged points in Euclidean space are processed in a training phase to determine a partition of the space to various classes. The tagged points may represent features of non-numerical objects such as scanned documents. Once the classes are determined, a new set of points can be classified based on the classification model constructed during the training phase.

BRIEF DESCRIPTION OF THE DRAWINGS

For a detailed description of exemplary embodiments of the invention, reference will now be made to the accompanying drawings in which.

DETAILED DESCRIPTION

In accordance with various implementations, numbers are extracted from non-numerical data so that a computing device can further analyze the extracted numerical data and/or perform a desirable type of operation on the data. The extracted numerical data may be referred to as "data points" or "coordinates." A type of technique for analyzing the numerical data extracted from non-numerical data includes determining a unique set of polynomials for each class of interest and then evaluating the polynomials on a set of data points. For a given set of data points, the polynomials of one of the classes may evaluate to 0 or approximately 0. Such polynomials are referred to as "approximately-zero polynomials." The data points are then said to belong to the class corresponding to those particular polynomials.

The principles discussed herein are directed to a technique by which a computing device processes data points in regards to multiple classes. The technique involves the data points being described in terms of corresponding classes.

Measurements can be made on many types of non-numerical data. For example, in the context of alphanumeric character recognition, multiple different measurements can be made for each alphanumeric character encountered in a scanned document. Examples of such measurements include the average slope of the lines making up the character, a measure of the widest portion of the character, a measure of the highest portion of the character, etc. The goal is to determine a suitable set of polynomials for each possible alphanumeric character. Thus, capital A has a unique set of polynomials, B has its own unique set of polynomials, and so on. Each polynomial is of degree n (n could be 1, 2, 3,etc.) and may use some or all of the measurement values as inputs.

Figure 1:
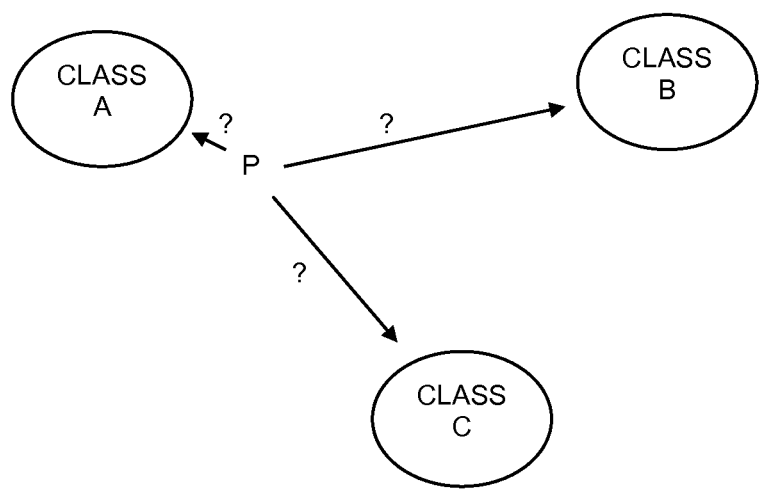
FIG. 1 shows an example of various classes.

FIG. 1 illustrates the existence of three classes—Class A, Class B, and Class C. A unique set of polynomials has been determined to correspond to each class. A data point P is shown. Data point P may actually include multiple data values. The goal is to determine to which class P belongs. The determination is made by plugging data point P into the polynomials of each class and determining which set of polynomials evaluates to near 0. The class corresponding to the set of polynomials that evaluates to near 0 is the class to which P is determined to correspond.

The classes depicted in FIG. 1 might correspond to the letters of the alphabet. For the letter A, for example, if the measurements (also called data points or coordinates) are plugged into the polynomials for the letter A, the polynomials evaluate to 0 or close to 0, whereas the polynomials for the other letters do not evaluate to 0 or approximately 0. So, a system encounters a character in a document, makes the various measurements, plugs those data points (or at least some of them) into each of the polynomials for the various letters, and determines which character's polynomials evaluate to 0. The character corresponding to that polynomial is the character the system had encountered.

Part of the analysis, however, is determining which polynomials to use for each alphanumeric character. A class of techniques called Approximate Vanishing Ideal (AVI) may be used to determine polynomials to use for each class. The word "vanishing" refers to the fact that a polynomial evaluates to 0 for the right set of input coordinates. Approximate means that the polynomial only has to evaluate to approximately 0 for classification purposes. Many of these techniques, however, are not stable. Lack of stability means that the polynomials do not perform well in the face of noise. For example, if there is some distortion of the letter A or extraneous pixels around the letter, the polynomial for the letter A may not at all vanish to 0 even though the measurements were made for a letter A. Some AVI techniques are based on a pivoting technique which is fast but inherently unstable.

The implementations discussed below are directed to a Stable Approximate Vanishing Ideal (SAVI) technique which, as its name suggests, is stable in the face of noise in the input data. The following discussion explains implementations of the SAVI technique and is followed by an implementation of the use of the SAVI technique to data classification (i.e., classifying data points in a multi-class environment).

Figure 2:
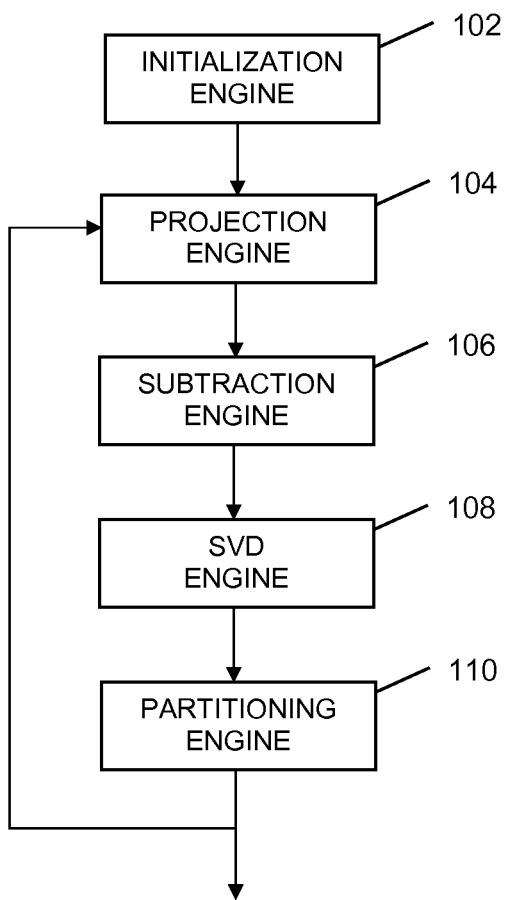
FIG. 2 shows an example of a system in accordance with an implementation.
Figure 3:
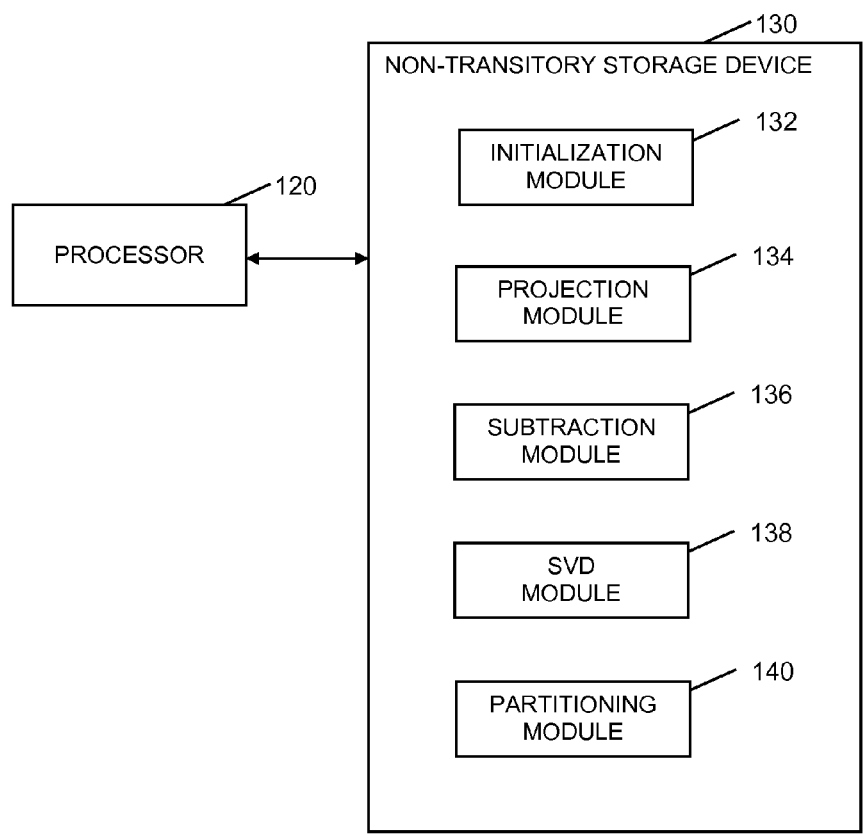
FIG. 3 shows another example of an implementation of a system.

FIG. 2 illustrates a system which includes various engines—an initialization engine 102, a projection engine 104, a subtraction engine 106, a singular value decomposition (SVD) engine 108, and a partitioning engine 110. In some examples, each engine 102-110 may be implemented as a processor executing software. FIG. 3, for example, shows one suitable example in which a processor 120 is coupled to a non-transitory storage device 130. The non-transitory storage device 130 may be implemented as volatile storage (e.g., random access memory), non-volatile storage (e.g., hard disk drive, optical storage, solid-state storage, etc.) or combinations of various types of volatile and/or non-volatile storage.

The non-transitory storage device 130 is shown in FIG. 3 to include a software module that corresponds functionally to each of the engines of FIG. 2. The software modules include an initialization module 132, a projection module 134, a subtraction module 136, an SVD module 138, and a partitioning module 140. Each engine of FIG. 2 may be implemented as the processor 120 executing the corresponding software module of FIG. 3.

The distinction among the various engines 102-110 and among the software modules 132-140 is made herein for ease of explanation. In some implementations, however, the functionality of two or more of the engines/modules may be combined together into a single engine/module. Further, the functionality described herein as being attributed to each engine 102-110 is applicable to the software module corresponding to each such engine, and the functionality described herein as being performed by a given module is applicable as well as to the corresponding engine.

Figure 4:
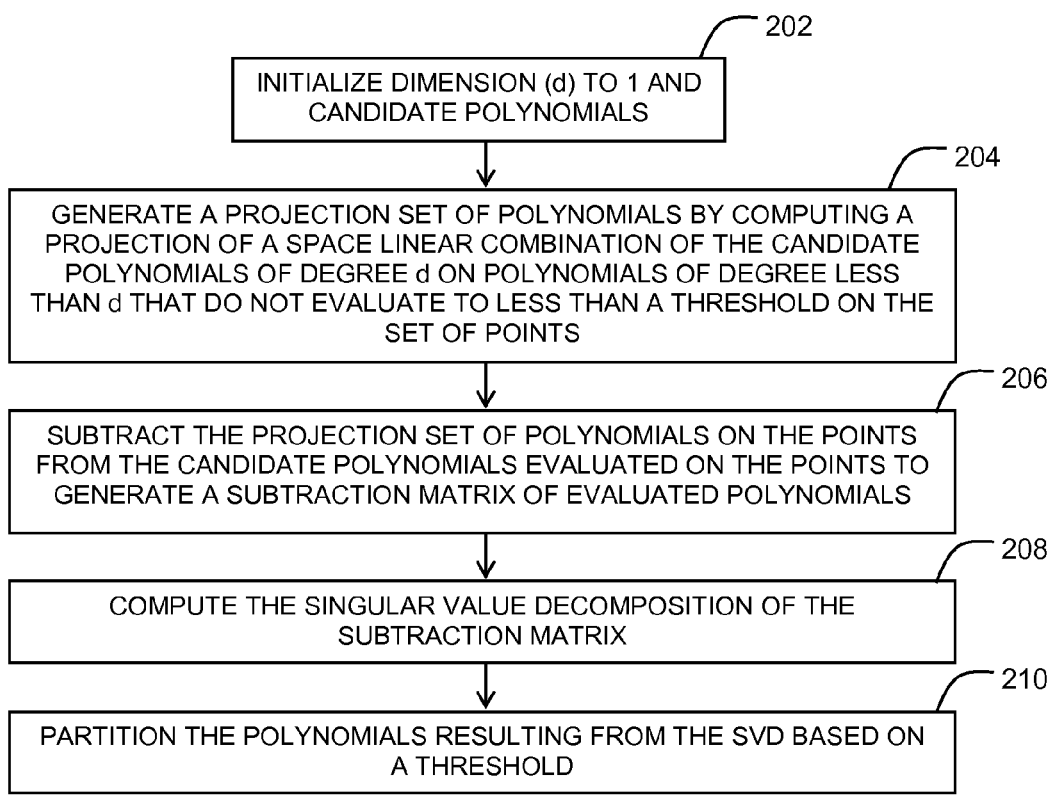
FIG. 4 shows a method in accordance with various examples.

The functions performed by the various engines 102-110 of FIG. 2 will now be described with reference to the flow diagram of FIG. 4. The SAVI process described herein may be an iterative process and the actions illustrated in FIG. 4 represent one iteration of the process. The SAVI process depicted in FIG. 4 is performed for each class for which polynomials are desired to be generated. The data (also called points or coordinates) referenced below represent training data used to generate the correct polynomials.

The initialization engine 102 initializes a dimension (d) to 1 (action 202). The disclosed SAVI process thus begins with dimension 1 polynomials. The initialization engine 102 also initializes a set of candidate polynomials. The candidate polynomials represent the polynomials that will be processed in the given iteration to determine which, if any, of the polynomials evaluate on a given set of points to approximately 0 (e.g., below a threshold). Those candidate polynomials that do evaluate on the points to less than the threshold are chosen as polynomials for the given class. The initial set of candidate polynomials may include all of the monomials in the coordinates. That is, there are as many monomials as there are coordinates in the training data.

The projection engine 104 then processes the set of candidate polynomials, for example, as described in illustrative action 204 in FIG. 4. In action 204, the projection engine 104 generates a projection set of polynomials. In some implementations, the projection set of polynomials is generated by computing a projection of a space linear combination of the candidate polynomials of degree d on polynomials of degree less than d that do not evaluate to 0 on the set of points. In the first iteration of the process d is 1 but in subsequent iterations through the process, d is incremented (2, 3, etc.). In the first pass through the algorithm with d equal to 1, the polynomials of degree less than d (i.e., degree 0) that do not evaluate to 0 on the set of points are represented by a scalar value such as 1/sqrt(number of points), where "sqrt" refers to the square root operator.

The following is an example of the computation of the linear combination of the candidate polynomials of degree d on the polynomials of degree less than d that do not evaluate to 0 on the set of points. The projection engine 104 may multiply the polynomials of degree less than d that do not evaluate to 0 by the polynomials of degree less than d that do not evaluate to 0 evaluated on the points and then multiply that result by the candidate polynomials of degree d evaluated on the points. In one example, the projection engine 104 computes:

$$E_d = O_{<d} O_{<d}(P)^t C_d(P)$$

where $O_{<d}$ represents the set polynomials that do not evaluate to 0 and are of lower than order d, $O_{<d}(P)^t$ represents the transpose of the matrix of the evaluations of the $O_{<d}$ polynomials, and $C_d(P)$ represents the evaluation of the candidate set of polynomials on the set of points (P). $E_d$ represents the projection set of polynomials evaluated on the points.

The subtraction engine 106 subtracts (as indicated at 206 in FIG. 4) the projection set of polynomials evaluated on the points from the candidate polynomials evaluated on the points to generate a subtraction matrix of evaluated polynomials, that is:

$$\text{Subtraction matrix} = C_d(P) - E_d(P)$$

The subtraction matrix represents the difference between evaluations of polynomials of degree d on the points, and evaluations of polynomials of lower degrees on the points.

The SVD engine 108 (at 208 in FIG. 4) then computes the singular value decomposition of the subtraction matrix. The SVD of the subtraction matrix results in the three matrices U, S, and $V^t$. U is a unitary matrix. S is a rectangular diagonal matrix in which the values on the diagonal are the singular values of the subtraction matrix. $V^t$ is the transpose of a unitary matrix and thus also a unitary matrix. That is:

$$\text{Subtraction matrix} = USV^*$$

A matrix may be represented a linear transformation between two distinct spaces. To better analyze the matrix, rigid (i.e., orthonormal) transformations may be applied to these space. The "best" rigid transformations would be the ones which will result in the transformation being on a diagonal of a matrix, and that is exactly what the SVD achieve. The values on the diagonal of the S matrix are called the "singular values" of the transformation.

The candidate polynomials for the next iteration of the SAVI process either include all of the candidate polynomials from the previous iteration or a subset of such polynomials. If a subset is used, then the SAVI process removes from the candidate polynomials those polynomials that evaluate to less than the threshold. If candidate polynomials are to be removed for a subsequent iteration of the process, then such polynomials are removed from further use in a numerically stable manner as described below.

The partitioning engine 110 partitions (action 210 in FIG. 4) the polynomials resulting from the SVD of the subtraction matrix based on a threshold. The threshold may be preconfigured to be 0 or a value greater than but close to 0. Any polynomial that results in a value on the points less than the threshold is considered to be a polynomial associated with the class of points being learned, while all other polynomials then become the candidate polynomials for the subsequent iteration of the SAVI process.

In one implementation, the partitioning engine 110 sets $U_d$ equal to $(C_d - E_d) V S^{-1}$ and then partitions the polynomials of $U_d$ according to the singular values to obtain $G_d$ and $O_d$. $G_d$ is the set of polynomials that evaluate to less than the threshold on the points. $O_d$ is the set of polynomials that do not evaluate to less than the threshold on the points.

The partitioning engine 110 also may increment the value of d, multiply the set of candidate polynomials in degree d-1 that do not evaluate to 0 on the points by the degree 1 candidate polynomials that do not evaluate to 0 on the points. The partitioning engine 110 further computes $D_d = O_1 \times O_{d-1}$ and then sets the candidate set of polynomials for the next iteration of the SAVI process to be the orthogonal complement in $D_d$ of span $\cup_{i=1}^{d-1} G_i \times O_{d-i}$.

The partitioning engine 110 then may cause control to loop back to action 204 in FIG. 4 in which the projection engine 104 repeats its operation with an increased degree d and new set of candidate polynomials. The result of the process of Figure is a set of one or more approximately-zero polynomials that describe a unique class.

Figure 5:
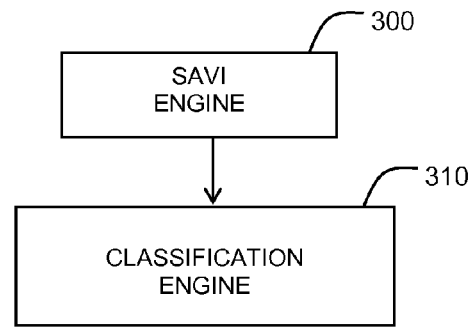
FIG. 5 shows an example of system including a stable approximation vanishing ideal (SAVI) engine and a classification engine in accordance with an implementation.

FIG. 5 illustrates a system usable to classify data points based on the SAVI technique described above. More specifically, the SAVI technique is used to determine approximately-zero polynomials that describe each of multiple classes in Euclidean space. The classes may represent any type of object. In one example, each class represents an alphanumeric character such as the letters of the alphabet and the polynomials determined by the SAVI technique to describe each such alphanumeric character are used to classify (e.g., recognize) new characters such as in a scanned document.

The illustrative system of FIG. 5 includes a SAVI engine 300 and a classification engine 310. As explained below, the SAVI engine 300 generates approximately-zero polynomials for each of multiple classes, and the classification engine 310 classifies points into the multiple classes based on distances computed using the generated approximately-zero polynomials.

Figure 6:
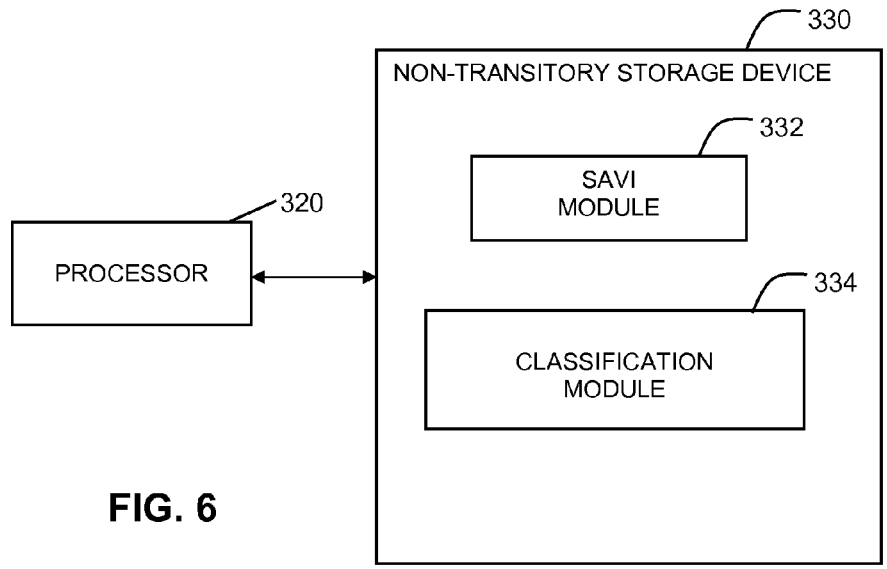
FIG. 6 shows an example of an implementation of the system of FIG. 5.

FIG. 6 shows one suitable example of the system of FIG. 5 in which a processor 320 is coupled to a non-transitory storage device 330. The non-transitory storage device 330 may be implemented as volatile storage (e.g., random access memory), non-volatile storage (e.g., hard disk drive, optical storage, solid-state storage, etc.) or combinations of various types of volatile and/or non-volatile storage.

The non-transitory storage device 330 is shown in FIG. 6 to include a software module that corresponds functionally to each of the engines of FIG. 5. The software modules include a SAVI module 332 and a classification module 334. Each engine of FIG. 5 may be implemented as the processor 320 executing the corresponding software module of FIG. 6.

The distinction among the engines 300 and 310, and among the software modules 332 and 334, is made herein for ease of explanation. In some implementations, however, the functionality of the engines/modules of FIGS. 5 and 6 may be combined together into a single engine/module. Further, the functionality described herein as being attributed to each engine 300 and 310 is applicable to the software module corresponding to each such engine, and the functionality described herein as being performed by a given module is applicable as well as to the corresponding engine.

The functions performed by the SAVI and classification engines 300 and 310 of FIG. 5 will now be described with reference to the flow diagram of FIG. 7. The operations shown in FIG. 7 can be performed in the order shown, or in a different order, and two or more of the operations can be performed in parallel rather than sequentially.

At 340, a threshold is set. This threshold is the threshold noted above in the SAVI process, and may be the same or different between the classes. The threshold may be set by the SAVI engine 300 and may be set initially to a default value.

At 342, the SAVI process explained previously is run to obtain the approximately-zero polynomials for the various classes of interest. For the example of alphanumeric character recognition, the SAVI process determines one or more approximately-zero polynomials for each alphanumeric character of interest based, for example, on a training data set of points.

At 344, the method includes the classification engine 310 evaluating the approximately-zero polynomials for each class on all the points to compute distances. Some of the points are associated with a particular class, and those points are evaluated on the polynomials for that particular class as well as the polynomials for all other classes. The same is true for all other points. For example, all instances of the letter "A" are evaluated on the polynomials for the class associated with the letter "A" as well as the polynomials for the calls associated with the letter "B," the letter "C," and so on. A "distance" from a point to a class is computed from the evaluations of that point on the polynomials for that particular class. For example, the distance from a point to a class may be computed as the square root of the sum of the squares of the evaluations of that point on the various approximately-zero polynomials corresponding to that class.

For a particular class, a point associated with that class may evaluate to, for example, 1.5, but for another class a corresponding point may evaluate to 103. That is, for the former class a point evaluates on the polynomials to "approximately" 0 for a value of 1.5, but approximately 0 for another class may mean 103. Accordingly, the approximately-zero polynomials may be scaled (346) by the classification engine 310 to correct for such scaling differences to thereby make the classification process more accurate.

At 348, the method comprises classifying the points by the classification engine 310 using the scaled approximately-zero polynomials. At 350, the classification engine 310 determines whether the classification is satisfactory. In some implementations, in excess of a predetermined number of percentage of incorrectly classified points may be detected by a person and, if so, cause the person informs the classification engine that the classification was not satisfactory. If the classification is satisfactory, the method ends and the scaled approximately-zero polynomials from operation 346 are used to classify future points.

If, however, the classification was not satisfactory, the threshold is adjusted at 352 and the control loops back to operation 342 and the method repeats.

Figure 7:
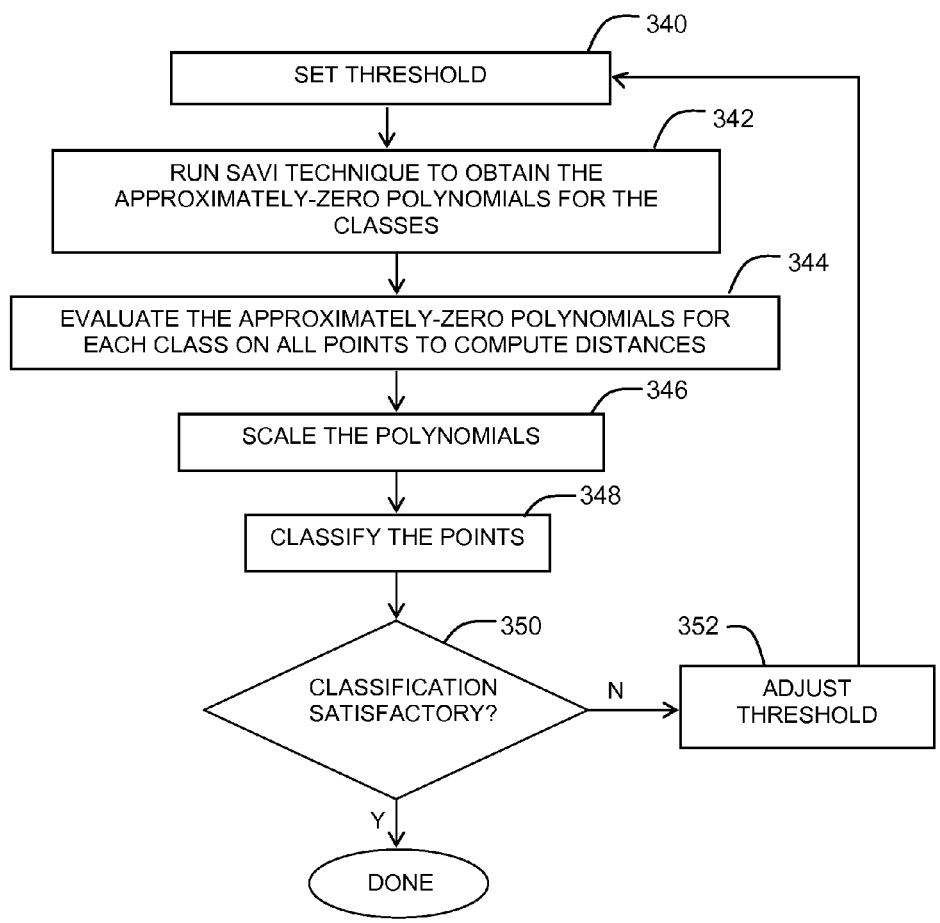
FIG. 7 shows a method of data point classification in accordance with an example.
Figure 8:
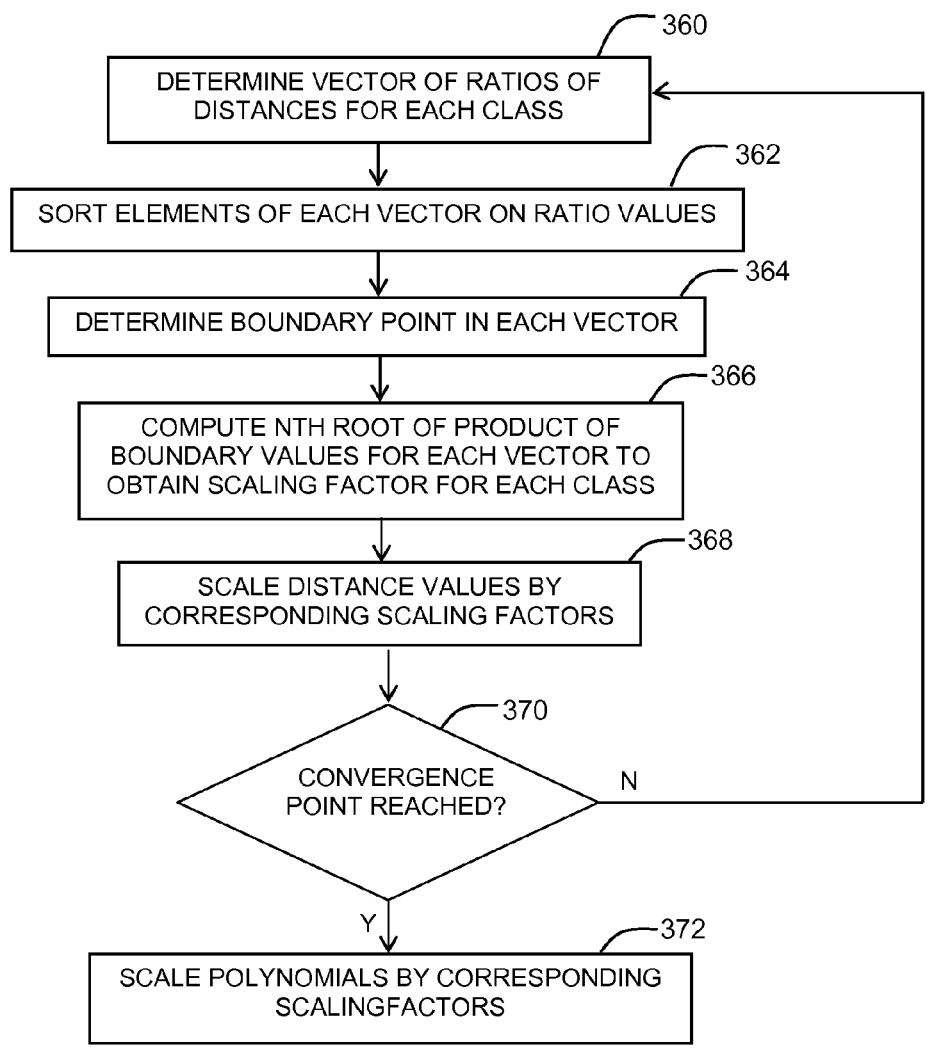
FIG. 8 shows a method of polynomial scaling in accordance with an example.

FIG. 8 shows an example of the scaling process of operation 346 in FIG. 7. The operations shown in FIG. 8 can be performed in the order shown, or in a different order, and two or more of the operations can be performed in parallel rather than sequentially. Reference also will be made to the example shown in FIG. 9.

Figure 9:
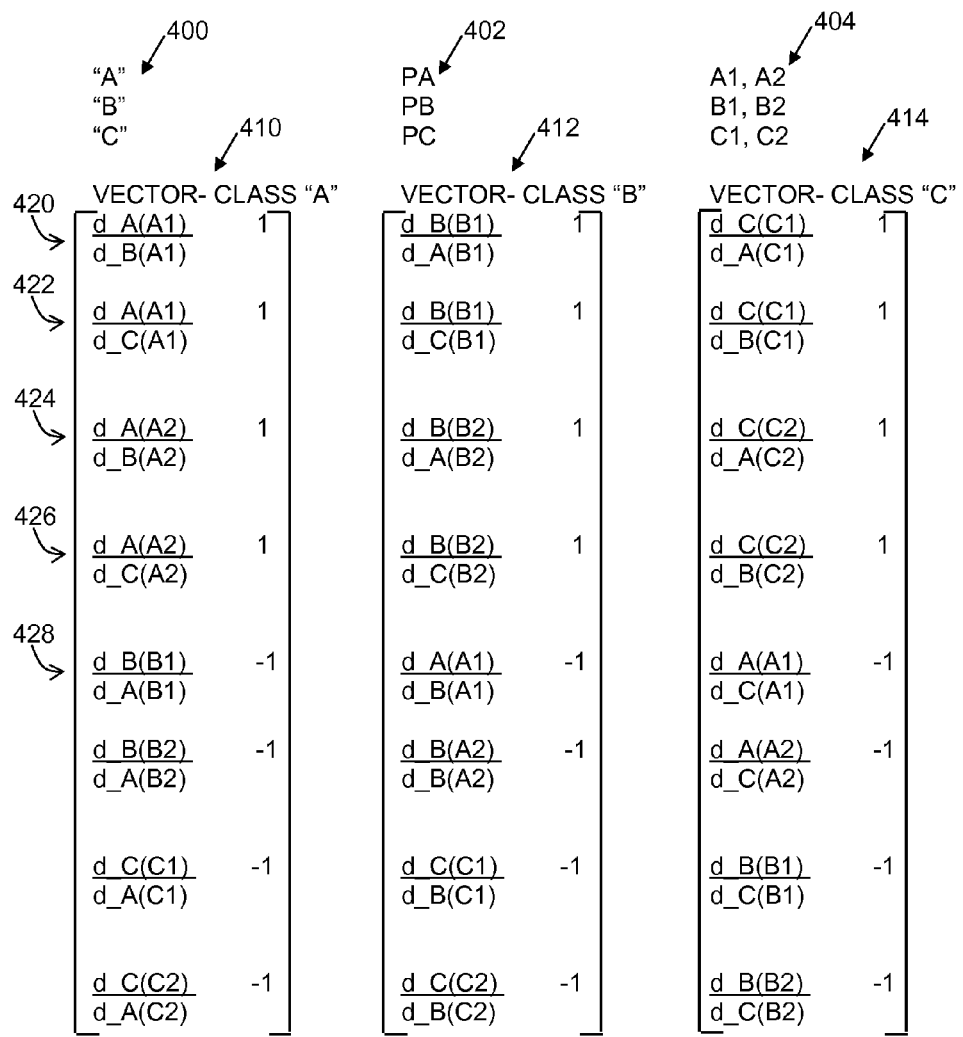
FIG. 9 shows an example of the generation of vectors of ratios of distances.

At 360, for each class, a vector is determined. The elements in the vector include ratios of distances. FIG. 9 shows an example of the construction of such vectors of distance ratios. Referring to FIG. 9, this example shows three classes 400 designated as "A," "B," and "C." The three classes 400 may represent the capital letters A, B, and C, but can represent any type of object in general. One or more polynomials 402 are shown corresponding to each class. $P_A$ represents the polynomials characterizing class A, while $P_B$ and $P_C$ represent the polynomials characterizing classes B and C, respectively. A1 and A2 represent data points associated with class A. For example, A1 and A2 may be different examples of the letter A. B1 and B2 represent data points associated with class B. C1 and C2 represent data points associated with class C.

FIG. 9 also shows one vector for each class, thus one vector 410 for class A, another vector 412 for class B, and yet another vector 414 for class C. Each vector includes multiple elements and each element as two values in the example of FIG. 9. The first value is a ratio of distances. For example, the first entry 420 in the vector 410 for class A includes the ratio of d_A(A1)/d_B(A1). The notation d_A(A1) means the distance from point A1 to class A. Similarly, the notation d_B (A1) means the distance from point Al to class B.

The first two entries 420 and 422 in vector 410 include ratios of the distances from point A1 to class A to the distances from point A1 to each of the other two class B and C. The next two entries 424 and 426 include ratios of the distances from point A2 to class A to the distances from point A2 to each of the other two class B and C. The second value in each of the entries 420-426 is a flag (1 in this example) to designate the corresponding distances as ratios of the distance from the points to their own class to distances to other classes.

The fifth entry 428 in vector 410 includes the ratio of the distance from point B1 to class B to distance of point B1 to class A. All other entries in vector 410 represent the ratio of the distances from the non-class points (B2, C1, and C2) to their own class B and C to the distance from those points to class A. The last four entries in vector 410 have "−1" as the flag to designate the corresponding ratios as ratios of distances of the non-class points to their own classes to the distance of those points to class A. Vectors 412 and 414 for classes B and C, respectively, are constructed in a similar fashion as shown.

Referring again to FIG. 8, at operation 362, the scaling method includes sorting the elements of each vector on the ratio values (i.e., the first value in each pair of values in the various entries of each vector). Then, at 364 the classification engine 310 determines a boundary point for each vector. In one example, the boundary point is the point at which on one side of the boundary point is a maximum number of "1" flags and on the other side is maximum number of "−1" flags. The boundary point lies between two entries in a given vector. The elements of the vector adjacent the boundary point (i.e., the element just above the boundary point and the elements just below the boundary point) are referred to as "boundary values.").

At 366, the classification engine 310 computes the nth root of the product of the two boundary values for each vector to obtain a scaling factor each class. In some implementations, the nth root may be the fourth root. In a two class example, the nth root may be the square root (i.e., the geometric mean of the two boundary values).

At 368, the classification engine 310 scales the distance values by the corresponding scaling factors. For example, the distance A1 to class A is scaled by the scaling factor computed for the class A vector.

At 370, the classification engine determines whether a convergence point has been reached. In some implementations, this determination may be made by determining when all entries in the newly corrected vector are close to 1 (e.g., within a threshold range of the value 1). This would mean that all the distances in the next iteration would be almost identical to the current iteration so there is no reason to continue iterating. If convergence has been reached, then at 372, the method comprises scaling the approximately-zero polynomials by the scaling factors. If convergence has not been reached, the control loops back to operation 360 and the process repeats this time using the scaled distance values from operation 368.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
  obtaining, by executing a module stored on a non-transitory computer-readable storage device, approximately-zero polynomials for each of multiple classes;
  evaluating the approximately-zero polynomials for each class on a plurality of points to compute distances from each point to each of the classes;
  scaling the approximately-zero polynomials based on the distances; and
  classifying the points based on the scaled approximately-zero polynomials.

2. The method of claim 1 further comprising:
  setting a threshold to be used to obtain the approximately-zero polynomials;
  determining whether the classification of the points is satisfactory; and
  based on the classification of the points not being satisfactory, adjusting the threshold and repeating the obtaining the approximately-zero polynomials using the adjusted threshold as well as evaluating the approximately-zero polynomials, scaling the approximately-zero polynomials, and classifying the points.

3. The method of claim 1 wherein obtaining the approximately-zero polynomials comprises:
  generating a projection set of polynomials by computing a projection of a space linear combination of candidate polynomials of degree d on polynomials of degree less than d that do not evaluate to less than a threshold on a set of points;
  subtracting the projection set of polynomials evaluated on the points from the candidate polynomials evaluated on the points to generate a subtraction matrix of evaluated polynomials;
  computing the singular value decomposition of the subtraction matrix of evaluated polynomials; and
  partitioning the polynomials resulting from the singular value decomposition based on a threshold.

4. The method of claim 1 wherein scaling the approximately-zero polynomials comprises determining a vector of ratios of distances for each class, at least one of the ratios including a ratio of a distance to a class from a first point associated with that class to a distance to another class from the first point.

5. The method of claim 4 wherein at least one other ratio includes a ratio of the distance to a class not associated with the first point to a distance to the class for which the first point is associated.

6. The method of claim 5 further comprising sorting the entries in each vector according to the ratios.

7. The method of claim 5 further comprising, for each vector, determining a boundary point and computing the nth root of a product of boundary values associated with the boundary point to generate a scaling factor for the corresponding vector.

8. The method of claim 7 further comprising scaling the approximately-zero polynomials by the scaling factors.

9. The method of claim 7 wherein the nth root is the fourth root.

10. A non-transitory, computer-readable storage device containing software than, when executed by a processor, causes the processor to:
  obtain approximately-zero polynomials for each of multiple classes;
  evaluate the approximately-zero polynomials for each class on a plurality of points to compute distances from each point to each of the classes;
  iteratively determine scaling factors for the multiple classes based on ratios of distances from the points to the classes;
  scale the approximately-zero polynomials based on the scaling factors; and
  classify the points based on the scaled approximately-zero polynomials.

11. The non-transitory, computer-readable storage device of claim 10 wherein the software causes the processor to obtain the approximately-zero polynomials for each of multiple classes by causing the processor to:
  generate a projection set of polynomials by computing a projection of a space linear combination of candidate polynomials of degree d on polynomials of degree less than d that do not evaluate to less than a threshold on a set of points;

subtract the projection set of polynomials evaluated on the points from the candidate polynomials evaluated on the points to generate a subtraction matrix of evaluated polynomials;

compute the singular value decomposition of the subtraction matrix of evaluated polynomials; and partition the polynomials resulting from the singular value decomposition based on a threshold.

12. The non-transitory, computer-readable storage device of claim 10 wherein the software causes the processor to:

set a threshold to be used to obtain the approximately-zero polynomials;

determine whether the classification of the points is satisfactory; and based on the classification of the points not being satisfactory, adjust the threshold and again obtain the approximately-zero polynomials using the adjusted threshold as well as evaluate the approximately-zero polynomials, scale the approximately-zero polynomials, and classify the points.

13. The non-transitory, computer-readable storage device of claim 10 wherein the software causes the processor to scale the approximately-zero polynomials by causing the processor to determine a vector of ratios of distances for each class, at least one of the ratios including a ratio of a distance to a class from a first point associated with that class to a distance to another class from the first point.

14. The non-transitory, computer-readable storage device of claim 13 wherein at least one other ratio includes a ratio of the distance to a class not associated with the first point to a distance to the class for which the first point is associated.

15. The non-transitory, computer-readable storage device of claim 14 wherein the software causes the processor to sort the entries in each vector according to the ratios.

16. The non-transitory, computer-readable storage device of claim 14 wherein, for each vector, the software causes the processor to determine a boundary point and compute the nth root of a product of boundary values associated with the boundary point to generate a scaling factor for the corresponding vector.

17. The non-transitory, computer-readable storage device of claim 16 wherein the software causes the processor to scale the approximately-zero polynomials by the scaling factors.

18. A system, comprising:

a stable approximately vanishing ideal engine to generate approximately-zero polynomials for each of multiple classes; and a classification engine to classify points into the multiple classes based on distances computed using the generated approximately-zero polynomials.

19. The system of claim 18 wherein the classification engine is to scale the approximately-zero polynomials in an iterative process based on ratios of the distances.

20. The system of claim 19 wherein the classification engine is to scale the approximately-zero polynomials based on a computation of a nth root of a product of a pair of ratios of the distances.

* * * * *